United States Patent [19]

Maycock et al.

[11] Patent Number: 4,697,684
[45] Date of Patent: Oct. 6, 1987

[54] FRICTION CLUTCH DRIVEN PLATE

[75] Inventors: Ian C. Maycock, Leamington Spa; Peter F. Crawford, Bubbenhall, both of England

[73] Assignee: Automotive Products plc, Leamington Spa, England

[21] Appl. No.: 932,008

[22] Filed: Nov. 18, 1986

[30] Foreign Application Priority Data

Dec. 5, 1985 [GB] United Kingdom ............... 8530010

[51] Int. Cl.4 ...................... F16D 69/00; F16D 13/52
[52] U.S. Cl. ............................ 192/107 R; 192/70.13; 192/106.2
[58] Field of Search ............... 192/70.13, 70.14, 70.16, 192/70.17, 107 R, 107 M, 107 C

[56] References Cited

U.S. PATENT DOCUMENTS

| | | | |
|---|---|---|---|
| 1,873,561 | 8/1932 | Else et al. | 192/105 BA |
| 1,968,130 | 7/1934 | Criley | 192/70.14 X |
| 2,016,305 | 10/1935 | Wales | 192/70.14 |
| 2,370,199 | 2/1945 | Shuckers | 192/105 BA |
| 4,478,323 | 10/1984 | Weissenberger | 192/70.2 X |

FOREIGN PATENT DOCUMENTS 2154288 9/1985 United Kingdom .

Primary Examiner—George H. Krizmanich
Attorney, Agent, or Firm—Solon B. Kemon

[57] ABSTRACT

A friction clutch driven plate has an internally splined hub, and externally a circular radial flange to rotate with the hub about the hub axis. The flange has teeth in its outer periphery which are in driving meshed engagement with teeth in the inner periphery of an annulus of friction material. That annulus is formed by separate successive arcuate sections or sectors of friction material. The sections of friction material can, axially of the hub, each move relatively to one another by a limited amount to improve the axial compliance of the friction annulus when in a clutch and clamped between a drive plate and a pressure plate. A holding strap extends around the outer periphery of the annulus to hold the sections thereof on the flange against centrifugal force.

10 Claims, 5 Drawing Figures

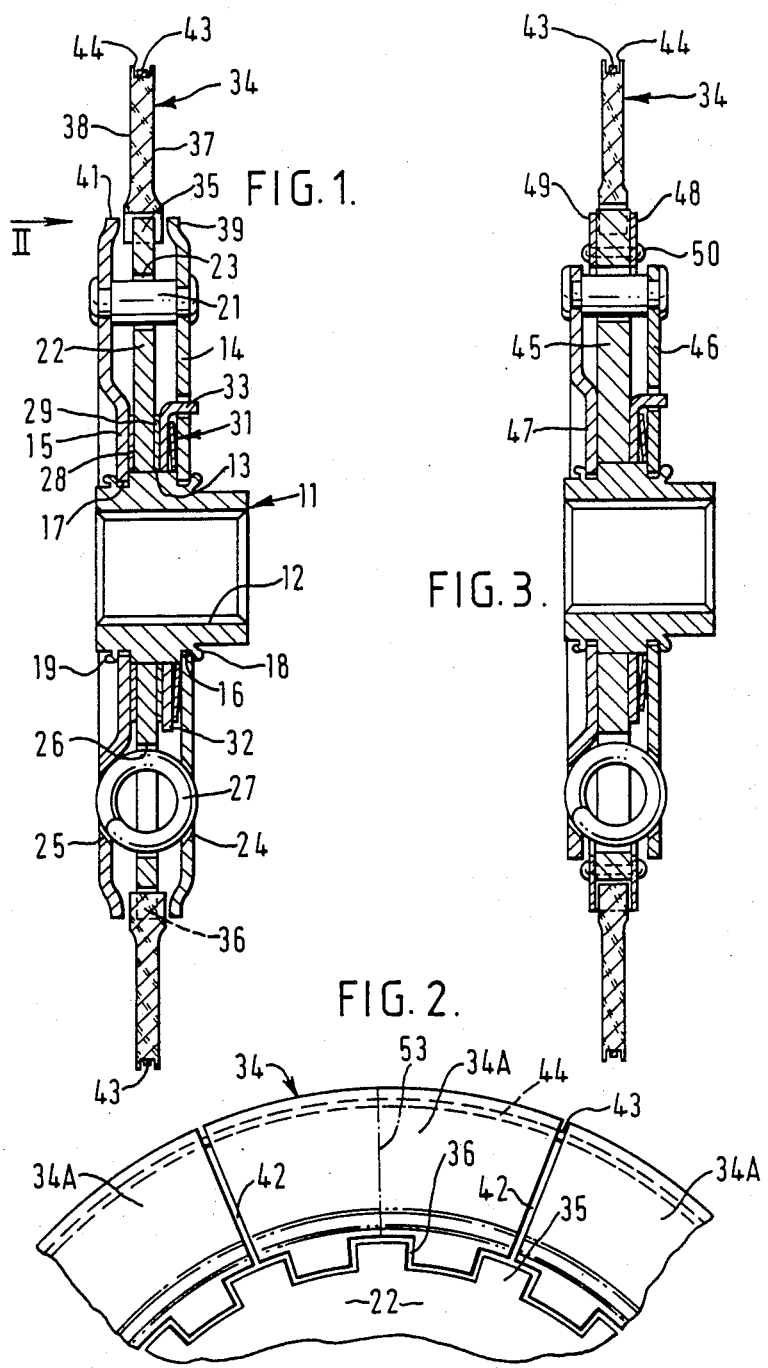

FRICTION CLUTCH DRIVEN PLATE

BACKGROUND OF THE INVENTION

This invention relates to improvements in friction clutch driven plates.

It concerns, though not exclusively, development of the friction clutch driven plate described in published British patent specification No. GB 2 154 288 A which discloses a driven plate comprising a hub assembly incorporating a hub and at least one flange extending therefrom, a carrier for a friction material arrangement, said carrier being arranged adjacent to the flange and capable of limited relative angular rotation with respect to said flange and coupled to the flange by resilient rotary drive means, the carrier being provided with outwardly extending teeth around the outer periphery, and a friction material arrangement in annular disposition and having inwardly directed teeth to engage with teeth on the carrier and provide drive between the carrier and friction material.

Specification No. GB 2154 288 A discloses a friction material arrangement in the form of a solid ring of friction material capable of some axial movement relative to the carrier by the teeth on the ring moving axially in the gaps between the teeth on the carrier. This allows the friction material some axial compliance when the driven plate is in use and being clamped between a drive plate and a pressure plate of a friction clutch. However the solid ring of friction material may be rather rigid and its axial compliance thus restricted, so the phenomenon known as "heat spotting" of the pressure plate may still occur to an undesirable extent.

An object of the invention is to provide a friction clutch driven plate capable of being constructed so that when it is used the aforesaid disadvantage of heat spotting may be avoided or at least mitigated.

SUMMARY OF THE INVENTION

According to the invention there is provided a friction clutch driven plate comprising a hub assembly provided with a carrier for a friction material arrangement, said carrier extending radially outwardly of the hub and being provided with outwardly extending teeth around its outer periphery, a friction material arrangement in annular disposition and having inwardly directed teeth to engage with the teeth of the carrier and provide drive between the carrier and the friction material, and said annular disposition comprising sections of the friction material arrangement disposed in succession in an annular array and capable of at least axial movement one relative to another.

Preferably the driven plate has means limiting outward radial movement of the sections relative to the carrier. Such means opposes the effect of centrifugal force on the sections of friction material.

Axial constraining means may be provided to retain the teeth of the friction material arrangement in engagement with the teeth of the carrier.

Each section of the friction material arrangement may be substantially a sector of an annulus.

The friction material used in the arrangement may be a mineral-based essentially non-metallic friction material.

The hub and carrier may be permanently fast in rotation one with the other about the axis of the driven plate.

Alternatively, the construction of the driven plate may be such that at least one flange extends from the hub, the carrier is adjacent to the flange and capable of limited relative angular rotation with respect to said flange, and said carrier is coupled the flange by resilient rotary drive means. The resilient rotary drive means can control relative rotation between the carrier and flange and provide damping of vibrations in the drive through the driven plate.

The driven plate may be intended for use in a dry clutch, that is one without lubrication of friction faces, for that purpose an asbestos-based friction material is suitable. However, substitutes for asbestos-based materials which have been introduced to eliminate health risks from asbestos are also suitable.

The driven plate may be used in a clutch of a motor vehicle.

BRIEF DESCRIPTION OF THE DRAWINGS

The invention will now be further described, by way of example, with reference to the accompanying drawings in which:

FIG. 1 is a cross-section through a clutch driven plate illustrating a first embodiment formed according to the invention;

FIG. 2 is a fragmentary view in the direction of arrow II of FIG. 1, with some parts removed in the interests of clarity;

FIG. 3 a view corresponding to FIG. 1 illustrating a second embodiment of clutch driven plate formed according to the invention.

DETAILED DESCRIPTION OF EMBODIMENTS

Figure 5:
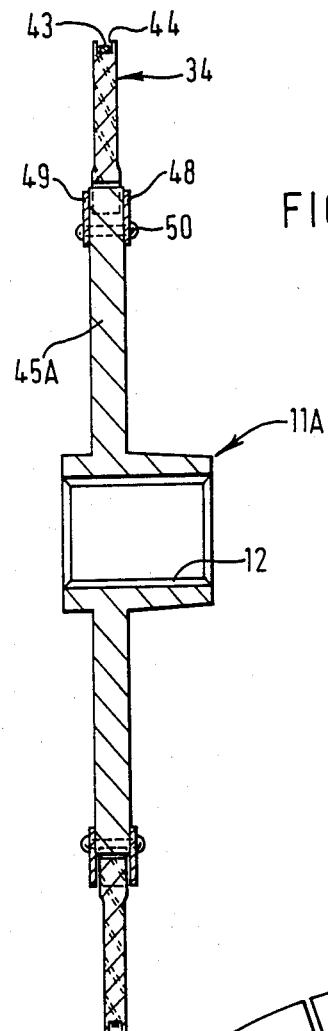
FIG. 5 is a view corresponding to FIG. 3 of a modification of the clutch driven plate in FIG. 3.

In the drawings like reference numerals identify like or comparable parts.

The friction clutch driven plate shown in Figs. 1 and 2 incorporates a hub 11 having internal splines 12 to enable the hub to drive a gearbox input shaft. The hub is geherally cylindrical with a projecting boss 13 remote from its two ends. Two annular side plates 14 and 15 are secured to the hub 11 at the extremities of the boss 13 so that they form two mutually spaced flanges which together with the hub 11 form a hub assembly. In this example, the inner edges of the side plates 14 and 15 have sets of inwardly directed teeth 16 and 17 which bite into shoulders at the edges ofthe boss 13 and are then more positively located by deforming these shoulders as illustrated at 18 and 19. The outer parts of the side plates or flanges 14 and 15 are also held in the required mutually spaced relationship by large shouldered rivets 21 which serve another purpose to be described subsequently and are normally referred to as stop pins. The hub assembly as thus far described is in practice assembled around other parts of the driven plate which are now to be described.

A friction material carrier constituted primarily by an intermediate annular plate 22 is arranged between the side plates 14 and 15 and in itself is freely rotatable on the boss 13. The intermediate plate 22 has circumferentially elongated apertures 23 through which the stop pins 21 extend. The length of these apertures limits the extent of relative angular rotation possible between the hub assembly and the friction member carrier. Side plates 14 and 15 and intermediate plate 22 also have a series of aligned rectangular spertures 24, 25 and 26 and a circumferentially directed coil spring 27 is arranged in each such set of aligned apertures. These springs provide a resilient rotary drive means between the hub assembly and the friction member carrier.

Between the inner parts of the side plates 14 and 15 and the intermediate plate 22 there is a conventional friction system for providing frictional resistance to movement between the hub assembly and carrier. This consists of two friction washers 28 and 29, one to each side of the intermmediate plate and a Belleville spring 31 reacting on side plate 14 and causing a bearing washer 32 to load the friction washers 28 and 29 axially. Bearing washer 32 has at least one tongue 33 engaged in side plate 14 to ensure that it rotates therewith.

The outer periphery of intermediate plate 22 carries a series of radially directed teeth 35 which engage with a corresponding series of inwardly directed teeth 36 on an annular friction material arrangement 34. The arrangement 34 comprises a plurality of sections 34A disposed end to end with some circumferential clearance 42 therebetween.

In the example illustrated each section 34A is wholly formed of friction material and each is substantially in the shape of a sector of an annulus. However each section 34A forming the arragement 34 can be in the form of two friction facings or layers of friction material sandwiching one or more layers of other material therebetween. The form and the engagement of the teeth 35, 36 is most readily seen in FIG. 2. The opposed drive faces of each tooth 35 are parallel to each other rather than being strictly radial and considering a recess between teeth rather than a tooth itself of the sections 34A, the two drive faces are correspondingly parallel. This arrangement provides that in the event of differential expansion between the intermediate plate 22 and the sections 34A, the radial expansion of the friction material arrangement does not result in a significant increase in circumferential clearance between teeth which may otherwise introduce an undesired freedom for relative rotation. A positive circumferential clearance is shown in FIG. 2 in the interests of clarity but in practice the clearance should be as small as possible. There is however a deliberate radial clearance between the intermediate plate 22 and sections 34A at the toothed connection 35, 36 to ensure that on differential expansion between the carrier and each section 34A, these two components do not load each other in such a way as might cause distortion.

In the example illustrated each section 34A is constituted by a solid piece of friction facing material as is normally used in dry friction clutches. In the interests of providing sufficient strength for teeth 36, the inner periphery of each section 34A is widened as shown in FIG. 1 while the outer part of each section has two opposed friction faces 37 and 38.

To retain the sections 34A about the carrier 22 an annular retaining strap 43 or other encircling arrangement is disposed in the successive outer peripheral grooves 44 in the sections 34A. The strap 43 opposes the effect of centrifugal force on the sections 34A in order to keep the teeth 36 in mesh with the teeth 35. However there is sufficient clearance between the sides of the strap 43 and the sides of the grooves 44 to allow the sections 34A to move axially relatively one to another and to the carrier 22. This allows the arrangement 34 to have greater axial compliance than if the arrangement 34 were a solid annulus. The clearances 42 are preferably sufficiently large so that in the event of thermal expansion of the sections 34A the latter do not press on one another or do not press on one another to an extent which prevents or unduly restricts the axial movement of the sections one relative to another.

In order to hold the arrangement 34 axially on the teeth 35, the two side plates 14 and 15 extend out beyond the inner periphery of the friction facing and have inwardly turned edges 39 and 41 to provide axial constraining means with a relatively small clearance for axial float of the sections 34A.

The embodiment shown in FIG. 3 corresponds in most respects to that shown in FIGS. 1 and 2. However, the intermediate plate 45 is thicker than the corresponding plate of FIG. 1 so that it conforms to the thickness of the inner part of the arrangement 34. The friction washers 28 and 29 of FIG. 1 are also omitted. The side plates 46 and 47 are of smaller external diameter than the corresponding side plates 14 and 15. Instead the axially movable arrangement 34 is held on to the intermediate plate 45 by small retainer plates 48 and 49 secured to the intermediate plate 45 by rivets 50.

In a modification, instead of arranging for the teeth 35 to have mutually parallel faces, the teeth 36 of the friction arrangement 34 may have parallel faces in which case the recesses between teeth 35 on the carrier have correspondingly parallel faces.

Figure 4:
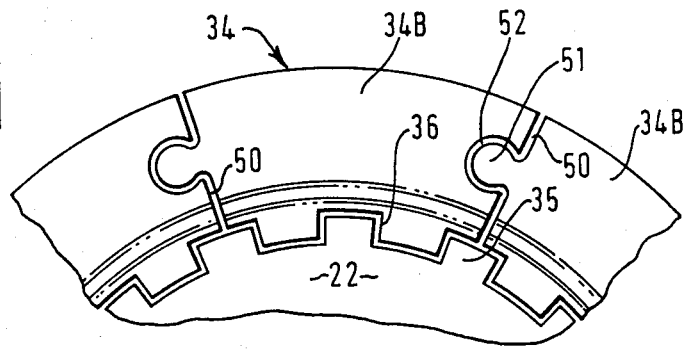
FIG. 4 is a view simillar to FIG. 2, of a modification of the sections of the friction material arrangement which is in annular disposition.

In the modification shown in FIG. 4 the friction arrangement 34 comprises sectors 34B with circumferential clearances 50 therebetween and having adjacent ends interlocked by a headed projection 51 on an end of one section 34B engagably retained in an opening 52 in the adjacent end of the adjacent section 34B so that the arrangement 34 holds together when subject to centrifugal force.

Dot-dash line 53 in FIG. 2 indicates that the arrangement 34 may be formed by sections of even shorter circumferential length than that of each sections 34A.

In the further embodiment of the clutch driven plate illustrated in FIG. 5, which in some respects is a modification of the embodiment in FIG. 3, the side plates 46 and 47 of FIG. 3 are omitted as are the springs 27 of FIG. 1. In FIG. 5 the hub 11A is integral or otherwise permanently fast with the flange 45A so that the hub and flange always rotate as one piece about the axis of the driven plate.

We claim:

1. A friction clutch driven plate comprising a hub assembly provided with a carrier for a friction material arrangement, said carrier extending radially outwardly of the hub and being provided with outwardly extending teeth around its outer periphery, a friction material arrangement in annular disposition and having inwardly directed teeth engaging with the teeth of said carrier to provide drive between the carrier and the friction material arrangement, said friction material having two oppositely and axially facing friction faces which extend substantially radially of said carrier, and said annular disposition comprising sections of the friction material arrangement disposed in succession in an annular array and capable of at least axial movement relative to one another.

2. A driven plate as claimed in claim 1, wherein aforesaid sections of the friction material arrangement are capable of limited radial movement relative to one another.

3. A driven plate as claimed in claim 1, having means limiting outward radial movement of said sections relative to said carrier.

4. A driven plate as claimed in claim 3, including restraining means encircling the annular array of sections for limiting outward radial movement of the sections.

5. A driven plate as claimed in claim 4, wherein said restraining means is disposed in peripheral grooves in the sections.

6. A driven plate as claimed in claim 3, wherein one end of a said section is formed with an opening engaged by a projection at an adjacent end of an adjacent section and extending substantially circumferentially.

7. A driven plate as claimed in claim 1, wherein axial constraining means are provided on the driven plate to retain the teeth of the friction material arrangement in engagement with the teeth of the carrier.

8. A driven plate as claim in claim 1, wherein each section is constituted by a solid piece of friction material having an outer part with two opposed annular friction faces and a widened inner part incorporating said inwardly directed teeth.

9. A driven plate as claimed in claim 1, wherein the toothed engagement between the sections and the carrier incorporates a radial clearance for allowing relative radial expansion and contraction of the carrier and said sections.

10. A driven plate as claimed in claim 1, wherein each said section is substantially a sector of an annulus.

* * * * *